United States Patent
Malsam et al.

(10) Patent No.: US 10,015,938 B1
(45) Date of Patent: Jul. 10, 2018

(54) SOIL MANAGEMENT SYSTEM (71) Applicant: Valmont Industries, Inc., Omaha, NE (US)

(72) Inventors: Craig S. Malsam, Omaha, NE (US); Jacob L. LaRue, Omaha, NE (US)

(73) Assignee: Valmont Industries, Inc., Omaha, NE (US)

(*) Notice: Subject to any disclaimer, the term of this patent is extended or adjusted under 35 U.S.C. 154(b) by 0 days.

(21) Appl. No.: 13/803,639

(22) Filed: Mar. 14, 2013

Related U.S. Application Data (60) Provisional application No. 61/613,069, filed on Mar. 20, 2012.

(51) Int. Cl.
  *A01G 25/09* (2006.01)
  *A01G 25/16* (2006.01)

(52) U.S. Cl.
  CPC .................. *A01G 25/167* (2013.01)

(58) Field of Classification Search
  CPC ...... A01G 25/167; A01G 25/16; A01G 1/001; A01G 25/165; A01G 25/00; A01G 27/003; A01G 27/008; A01G 27/001; A01G 9/247; G05B 2219/2625; G01N 27/223; G01N 33/246; G01N 33/0098; G01N 13/04; G01N 27/121
  USPC .................................................... 239/63–65
  See application file for complete search history.

(56) References Cited

U.S. PATENT DOCUMENTS

| | | | | |
|---|---|---|---|---|
| 3,967,198 A * | 6/1976 | Gensler | ..................... | A61B 5/04 324/692 |
| 4,015,366 A * | 4/1977 | Hall, III | ......................... | 47/1.43 |
| 4,315,599 A * | 2/1982 | Biancardi | ........................ | 239/10 |
| 4,892,113 A * | 1/1990 | Fattahi | .................. | A01G 25/167 137/624.12 |
| 5,148,825 A * | 9/1992 | Gil | ........................ | A01G 25/167 137/529 |
| 5,337,957 A * | 8/1994 | Olson | ................... | A01G 25/167 137/78.3 |
| 6,079,433 A * | 6/2000 | Saarem | ................. | A01G 25/167 137/1 |
| 6,401,742 B1 * | 6/2002 | Cramer | ................. | A01G 25/167 137/78.3 |
| 6,705,542 B2 * | 3/2004 | Calbo | ................... | A01G 25/167 239/63 |
| 6,870,376 B1 * | 3/2005 | Gensler | ..................... | A01G 7/00 324/663 |
| 6,975,246 B1 * | 12/2005 | Trudeau | .................... | B60T 7/22 180/167 |

(Continued)

*Primary Examiner* — Arthur O Hall
*Assistant Examiner* — Adam J Rogers
(74) *Attorney, Agent, or Firm* — Milligan PC LLO (57) ABSTRACT

An irrigation system is disclosed that includes a control system for determining whether to apply a soil conditioning agent to an agricultural field is disclosed. In an implementation, the control system includes memory operable to store one or more modules and a processor coupled to the memory. The processor is operable to execute the one or more modules to cause the processor to receive one or more signals representing a soil moisture characteristic from a soil sensor. The processor is also operable to determine whether to apply a soil conditioning agent to a soil based upon the soil moisture characteristic and to initiate operation of the irrigation assembly to apply the soil conditioning agent to the soil in response when the soil requires the soil conditioning agent.

12 Claims, 4 Drawing Sheets

(56) References Cited

U.S. PATENT DOCUMENTS

| | | | | |
|---|---|---|---|---|
| 8,035,403 | B1* | 10/2011 | Campbell | A01G 25/167 324/694 |
| 8,111,076 | B1* | 2/2012 | Gensler | G01N 33/0098 239/71 |
| 8,565,927 | B1* | 10/2013 | Campbell | A01G 25/167 111/118 |
| 8,793,024 | B1* | 7/2014 | Woytowitz | B05B 12/02 137/78.2 |
| 9,719,952 | B1* | 8/2017 | Gensler | G01N 33/188 |
| 2005/0273300 | A1* | 12/2005 | Patwardhan et al. | 703/9 |
| 2007/0220808 | A1* | 9/2007 | Kaprielian et al. | 47/48.5 |
| 2008/0046130 | A1* | 2/2008 | Faivre et al. | 700/284 |
| 2009/0293354 | A1* | 12/2009 | Goldberg et al. | 47/66.6 |
| 2013/0223934 | A1* | 8/2013 | Veitsman | A01G 25/167 405/37 |

* cited by examiner

SOIL MANAGEMENT SYSTEM

CROSS-REFERENCE TO RELATED APPLICATIONS

The present application claims the benefit under 35 U.S.C. § 119(e) of U.S. Provisional Application Ser. No. 61/613,069, entitled SOIL MANAGEMENT SYSTEM, filed on Mar. 20, 2012. U.S. Provisional Application Ser. No. 61/613,069 is herein incorporated by reference in its entirety.

BACKGROUND

Modern day agriculture has become increasingly efficient in the past century and this trend must continue in order to produce a sufficient food supply for the increasing world population. A notable advancement in agricultural production was the introduction of mechanized irrigation systems, such as the center pivot and the linear move irrigation systems. These irrigation systems make it possible to irrigate entire fields, and reduce a crop yield's vulnerability to extreme weather conditions. The ability to monitor and to control the amount of water and/or nutrients (applicants) applied to an agricultural field has increased the amount of farmable acres in the world and increases the likelihood of a profitable crop yield. These irrigation systems typically include a control device configured to furnish a user interface allowing the operator to monitor and control one or more functions or operations of the irrigation system.

SUMMARY

An irrigation system is disclosed that includes a control system for determining whether to apply a soil conditioning agent to an agricultural field is disclosed. In an implementation, the control system includes memory operable to store one or more modules and a processor coupled to the memory. The processor is operable to execute the one or more modules to cause the processor to receive one or more signals representing a soil moisture characteristic from a soil sensor. The processor is also operable to determine whether to apply a soil conditioning agent to a soil based upon the soil moisture characteristic and to initiate operation of the irrigation assembly to apply the soil conditioning agent to the soil in response when the soil requires the soil conditioning agent.

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

The growth and maintenance of planted crops is dependent on an adequate and regular supply of water to the plant roots. The water is absorbed directly from the soil that is in a layer from the surface to the depth of the roots. This region may generally be referred to as the root zone. When water is applied to the surface of the soil it may or may not become readily available to the roots for absorption depending on the condition of the soil. If the water cannot adequately wet and penetrate the soil, it will run off due to gravity before it can be absorbed by the roots. Conversely, if the soil is too permeable, water may pass to a region of the soil below the root zone to an area of the soil where it is not useful for the plants.

Soil additives have been used in the past to condition soil so that it may be more suitable for holding moisture in the root zone of plants. The moisture holding capacity of the soil may be increased by adding one or more of these conditioning agents. Typical soil conditioning agents include surface acting agents, or surfactants. Surfactants serve to lower the surface tension of water and thus can increase wetting of the soil and penetration of water into the root zone. Surfactants may be particularly useful for clay soils that typically experience a relatively high amount of water runoff. Other agents may include water holding agents such as water soluble polymers. These polymers can act to hold moisture that has penetrated the surface in the root zone of the plants. These agents may be particularly useful in sandy soils where water may quickly drain through the root zone where it is not accessible to the plants.

Many soils engaged in active agriculture include a mixture of clay and sandy characteristics. Accordingly, at various times, combinations of surfactants and water holding agents may be useful. These combinations may be formulated for specific soil types. Thus, the use of soil conditioning agents can improve the efficiency of irrigation and reduce the amount of water needed to bring a crop to maturity.

Figure 1A:
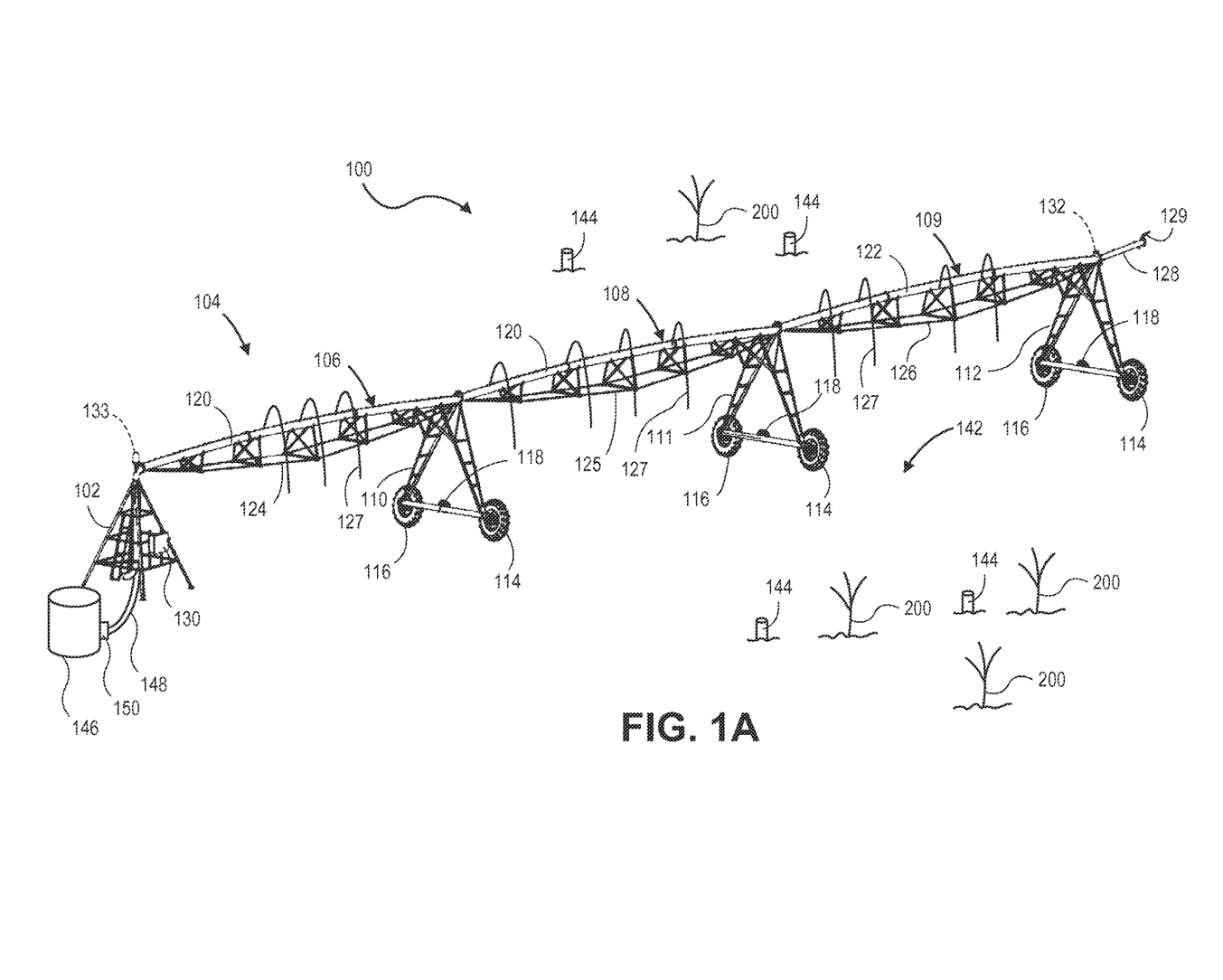
FIG. 1A is an isometric diagrammatic perspective view of an irrigation system in accordance with an example implementation of the present disclosure.
Figure 1B:
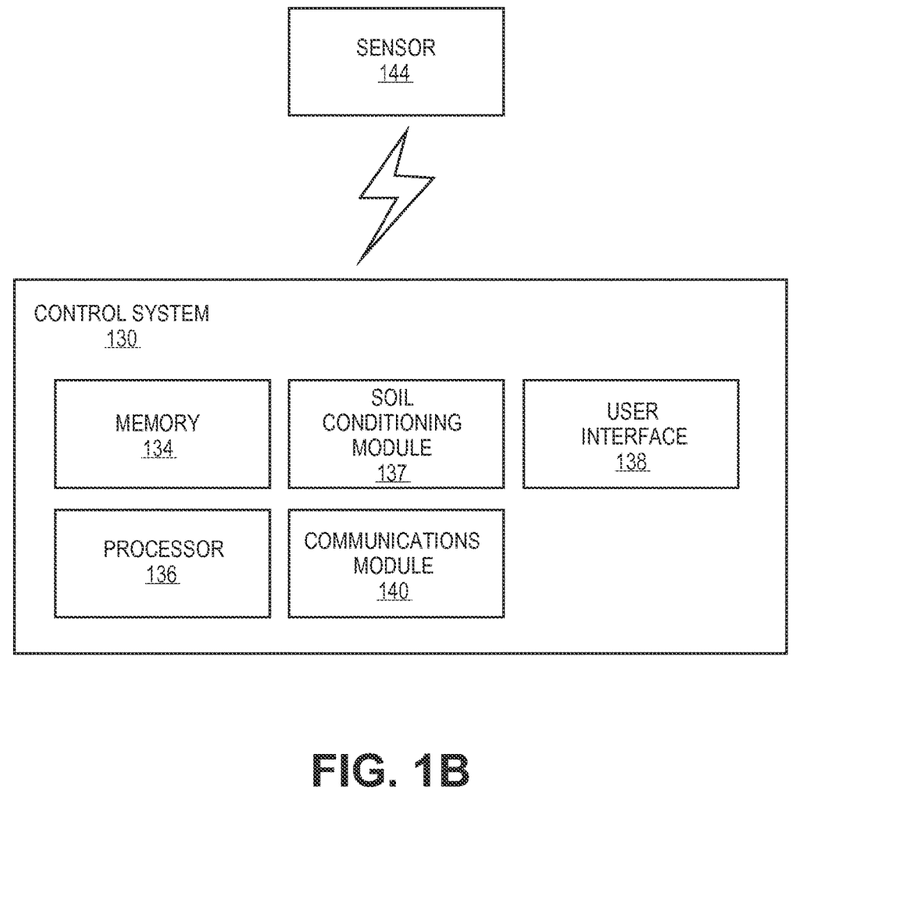
FIG. 1B is a block diagram illustrating a control system of the irrigation system shown in FIG. 1A in accordance with an example implementation of the present disclosure.

FIGS. 1A and 1B illustrate a self-propelled (e.g., mechanized) irrigation system (assembly) 100 in accordance with example implementations of the present disclosure. Examples of self-propelled irrigation systems include a center pivot irrigation system, a linear move irrigation system, or the like. FIG. 1A illustrates an embodiment of the present disclosure where the irrigation system 100 is a center pivot irrigation system. However, it is contemplated that the present disclosure may be implemented in other self-propelled irrigation systems (e.g., linear move irrigation systems). As shown, the system 100 includes a center pivot structure 102, a main section assembly 104 (irrigation section assembly) coupled (e.g., connected) to the center pivot structure 102. The center pivot structure 102 has access to a well, a water repository (e.g., water tank), or other fluid source, to furnish water to the irrigation system 100. For instance, the well may be located under the center pivot structure 102. In another instance, the well may be in close proximity to the cultivation area (e.g., field). The fluid source may be coupled to a repository or other source of agricultural products to inject fertilizers, pesticides, and/or other chemicals into the fluids to create an applicant for application during irrigation. Thus, the applicant may be water, fertilizer, herbicide, pesticide, combinations thereof, or the like. The irrigation system 100 may be coupled to a fluid displacement device (e.g., a pump assembly) configured to furnish applicant throughout the irrigation system 100. For example, the fluid displacement device may assist in displacing fluid from the fluid source (e.g., well, water repository, etc.) to the conduit portions of the irrigation system which are described herein. The center pivot structure 102 can be fixed or can be towable such that an operator can move the irrigation system 100 from one field to another. In an implementation, the center pivot structure 102 may comprise a frame assembly (e.g., galvanized steel frame assembly, and so forth).

The main section assembly 104 includes a number of interconnected spans 106, 108, 109 (e.g., irrigation spans) supported by one or more tower structures 110, 111 (intermediate tower structures) and an end tower structure 112. The tower structures 110, 111, 112 may be any tower configuration known in the art to adequately support the conduits (e.g., water pipe sections) described herein. It is understood that the section assembly 104 may include any number of spans and tower structures.

The tower structures 110, 111 and the end tower structure 112 each include wheels 114, 116, to assist in traversing the irrigation system 100 (e.g., allowing the main section assembly 104 to pivot) about a cultivation area (e.g., field). In an implementation, the wheels 114, 116 may be driven by a suitable drive unit 118 (e.g., drive motor), or the like, to assist in traversing the system 100 about the specified area. For example, each tower structure 110 may include a drive unit 118 to propel the respective tower structure 110, 111, 112 (and the irrigation system 100) through the cultivation area.

As shown in FIG. 1A, each span 106, 108 includes conduits 120, 121, 122 (e.g., pipes) that are configured to carry (e.g., transport, provide, and so forth) liquid (e.g., applicant) along the length of the system 100 to one or more applicant dispersal assemblies that are configured to irrigate the cultivation area. Each conduit 120, 121, 122 may be coupled to one another to allow fluid communication between each conduit. In an implementation, the conduits 120, 121, 122 may be supported by truss-type framework structures 124, 125, 126. Thus, the main fluid displacement device may be configured to displace applicant through the conduits 120, 121, 122, which is then dispersed by the dispersal devices 127, which are coupled to the conduits 120, 121, 122. As shown in FIG. 1A, the irrigation system 100 also includes a cantilevered boom structure 128 that extends outwardly from the end tower structure 112. In one or more implementations, the cantilevered boom 128 includes an end gun 129 (e.g., end gun 129 is mounted to the cantilevered boom 128). The end gun 129 may be a suitable pressure sprayer configured to be activated at the corners of a field, or other designated areas, to increase the amount of land that can be irrigated.

As shown in FIGS. 1A and 1B, the irrigation system 100 includes a control system 130 that is in electronic communication with one or more components of the system 100. For example, the control system 130 may be in electronic communication with one or more tower boxes mounted at one or more tower structures 110, 111, 112, and a position sensor 132 utilized to determine an approximate position of the irrigation system (e.g., determining the approximate position of the end tower structure 112 within the cultivation area with respect to the center pivot structure 102). In an implementation, the position sensor 132 may be a GPS sensor (e.g., GPS receiver), or the like, mounted to the end tower structure 112 configured to transmit signals representing the position of the end tower structure to the control system 130. As described herein, the control system 130 is configured to determine the radial position of the main section assembly 104 with respect to the center pivot structure 102. In another implementation, the position sensor 132 may be an angle sensor 133 configured to facilitate determination of the rotational position of the main section assembly 104. The angle sensor 133 may be mounted to the center pivot structure 102 to assist in determining the rotational position of the main section assembly 104.

In an implementation, the control system 130 is mounted to the central pivot structure 102, a control cart, or a tower structure 110, 111, 112. The control system 130 is generally located on the structural element of the irrigation system 100 where the applicant/water is introduced into the irrigation system; however, other configurations known in the art are within the scope of the present disclosure.

The control system 130 is configured to monitor operating conditions and configured to control various functions of the irrigation system 100. In certain implementations, the control system 130 actively monitors the irrigation system's 100 function and performance including, but not limited to: a position of one or more conduit sections 120, 121, 122 or tower structures 110, 111, 112 (e.g., the position of the main section assembly 104), whether the irrigation system 100 is powered on or off, a voltage parameter associated with the irrigation system 100, a motor speed parameter associated with the irrigation system 100, an approximate ground speed parameter associated with the irrigation system 100, a direction parameter associated with the irrigation system 100, a diagnostic parameter associated with the irrigation system 100, whether the applicant is being supplied to the irrigation system 100 (e.g., whether the fluid displacement device is operational), whether the Stop in Slot (SIS) is powered on or off, an applicant pressure associated with the irrigation system 100, a time parameter, a date parameter, a field position parameter of the irrigation system components, end-gun status, and whether the programs (e.g., software programs, etc.) are running properly. The control system 130 also controls the irrigation system 100's functions and settings including, but not limited to: start and stop, selectively powering the main fluid displacement device, an applicant application depth parameter, the direction of travel associated with the irrigation system 100, selectively powering the SIS, automatically reversing or stopping the irrigation system 100, automatically restarting the irrigation system 100, providing an operator auxiliary control to the system 100, writing and editing irrigation programs (e.g., irrigation software programs), and controlling sector and sequential programs (e.g., software programs). In another implementation, the control system 130 may cause an alert to be issued to the operator if there are any errors in the operation of the irrigation system 100 or if any of the functions or conditions monitored by the control system 130 have been compromised (e.g., ceased operation or are outside an acceptable range).

The control system 130 may be accessed through an interface 138 housed within a weather-proof box 130A. As shown in FIG. 1B, the control system 130 includes at least a memory 134 to store one or more software programs (e.g., software modules), a processor 136 communicatively coupled to the memory 134, a user interface 138 (e.g., graphical user interface, etc.), and a communications module 140 (e.g., transmitter, receiver, transceiver, etc.). The memory 134 is an example of tangible computer-readable media that provides storage functionality to store various data associated with the operation of the control system 130, such as software programs/modules and code segments mentioned herein, or other data to instruct the processor 136 to perform the steps described herein. As shown, the control system 130 includes a soil conditioning module 137, which is storable in the memory 134 and executable by the processor 136. The soil conditioning module 137 is representative of functionality to cause the dispersal of an applicant, such as water, combined with a soil conditioning agent from the irrigation system 100, as described in greater detail below. The user interface 138 is configured to receive one or more user-defined parameters (user-defined inputs) for operating the irrigation system 100.

As shown in FIG. 1A, the irrigation system 100 is positioned within an agricultural field 142 and configured to disperse an applicant to the field 142. The field 142 may include one or more sensors 144 deployed within the field 142. The sensors 144 are configured to communicatively interface with the control system 130. For example, the sensors 144 may be communicatively connected to the control system 130 via one or more in-ground wires. In another example, the sensors 144 may be communicatively connected to the control system 130 via a wireless communication network (i.e., communicatively connected with the communications module 140). In this example, the sensors 144 are configured to transmit one or more wireless signals to the control system 130, as described in greater detail herein.

In one or more implementations, the sensors 144 are configured to measure a moisture content of the field 142. For example, the sensors 144 are configured to determine (i.e., measure) the amount of moisture within a portion of the soil of the field 142 for which the respective sensor 144 is positioned. For instance, the sensors 144 are configured to measure a volumetric soil moisture and provide one or more signals representing the same.

Figure 2:
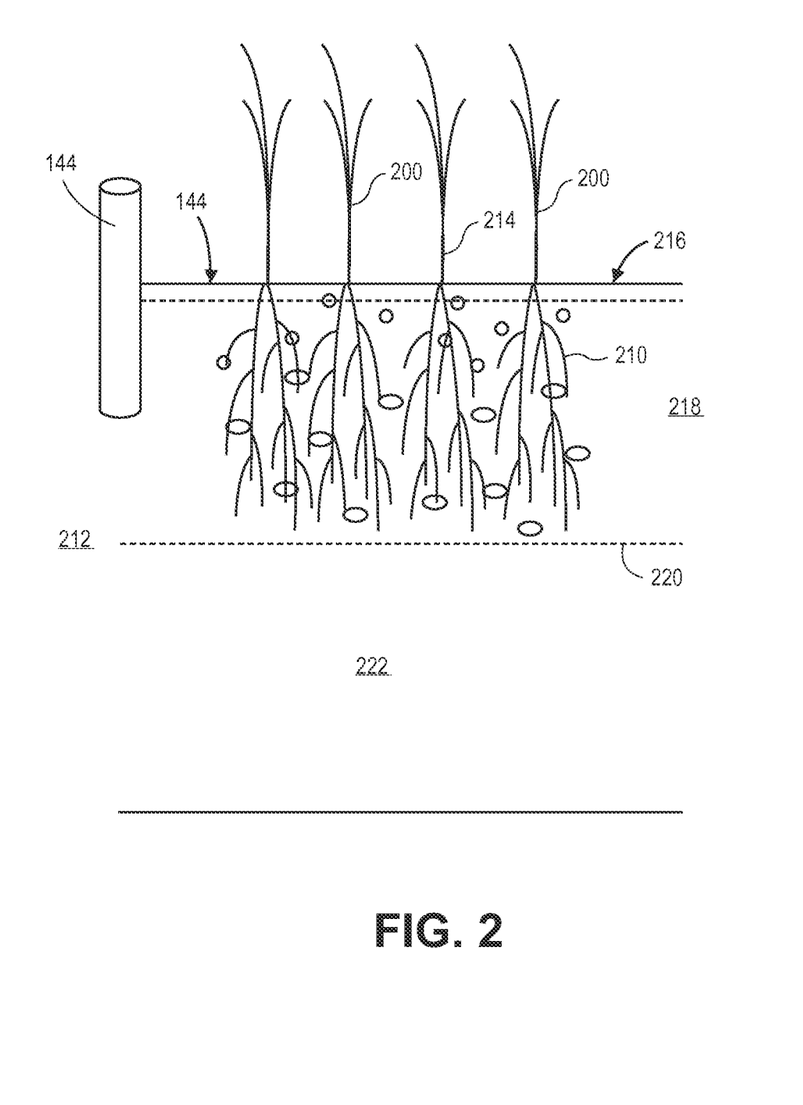
FIG. 2 is a side cross-sectional view of a plant root zone.

As shown in FIG. 2, a crop plant 200 is shown at a stage of its growth where the roots 210 extend downwardly into the soil 212. A stalk 214 is shown extending upwardly from the soil surface 216. However, it is understood that the plant could be any crop plant regardless of the stalk illustrated. A region 218 (i.e., the root zone) extends from the surface 216 of the soil to a point below the surface denoted as line 220. The soil below the root zone 218 is not in sufficient proximity to the roots 210 to allow moisture contained therein to be absorbed by the roots 210.

In heavy, clay soils, water, or applicant, from precipitation or irrigation may runoff of the soil surface 216 and beyond the boundaries of the agricultural field 142 before the water/applicant can migrate into the soil 212. Conversely, in sandy soils, water may drain too quickly through the root zone and into a zone 222 below the root zone where roots 210 do not have access to the moisture.

The moisture holding capacity of the soil 212 may be increased by adding one or more soil conditioning agents to the applicant dispersed from the irrigation system 100. Suitable soil conditioning agents may include surface acting agents or surfactants. Surfactants serve to lower the surface tension of the water/applicant dispersed, and thus, can increase wetting or infiltration of the soil and penetration of water into the root zone. Surfactants may be useful for clay soils that typically experience a relatively high amount of water runoff. For example, an example surfactant is the INFIL brand soil conditioning agent, which is an aqueous solution of copolymers of polyethylene and propylene glycols.

Other examples of soil conditioning agents/surfactants that may be used in the present disclosure include, but are not limited to: polyoxyl 40 stearate, polyoxyl 50 stearate, triblock co-polymers of ethylene oxide/propylene oxide/ethylene oxide, sorbitan monopalmitate, sorbitan monostearate, glycerol monostearate, polyoxyethylene stearate, polyoxyethylene 40 sorbitol lanolin derivative, polyoxyethylene 75 sorbitol lanolin derivative, polyoxyethylene 6 sorbitol beeswax derivative, polyoxyethylene 20 sorbitol beeswax derivative, polyoxyethylene 20 sorbitol lanolin derivative, polyoxyethylene 50 sorbitol lanolin derivative, polyoxyethylene 23 lauryl ether, polyoxyethylene 23 lauryl ether, polyoxyethylene 2 cetyl ether, polyoxyethylene 10 cetyl ether, polyoxyethylene 20 cetyl ether, polyoxyethylene 2 stearyl ether, polyoxyethylene 10 stearyl ether, polyoxyethylene 20 stearyl ether, polyoxyethylene 21 stearyl ether, polyoxyethylene 20 oleyl ether, polyoxyethylene 40 stearate, polyoxyethylene 50 stearate, polyoxyethylene 100 stearate, sorbitan monopalmitate, sorbitan monostearate, sorbitan tristearate, polyoxyethylene 4 sorbitan monostearate, polyoxyethylene 20 sorbitan tristearate, and mixtures thereof.

Other agents may include water holding agents such as water soluble polymers. These polymers can act to hold moisture that has penetrated the surface in the root zone of the plants. These agents may be particularly useful in sandy soils where water may quickly drain through the root zone where it is not accessible to the plants. Some suitable water holding agents include high molecular weight polymers such as acrylamide/sodium acrylate copolymers such as the SEAL & SAVE brand water soluble polymer.

The irrigation system 100 further includes a repository 146 that is in fluid communication with the conduits 120, 121, 122. In one or more implementations, the repository 146 comprises a storage tank configured to store the soil conditioning agents. For example, the repository 146 may be a storage tank that is positioned proximate to the center pivot structure 102 and is connected to the conduit 120 via a fluid communication device 148 (e.g., a conduit, such as a pipe, tube, or the like). The control system 130 is operatively coupled to the repository 146. For instance, the control system 130 is configured to cause the repository 146 to disperse an amount of soil conditioning agent to the conduit 120, which mixes with the applicant and is dispersed by the irrigation system 100 via the dispersal devices 127 and/or the end gun 129. In one or more implementations, the control system 130 is operatively coupled to a valve 150 that controls the dispersal of the soil condition agent to the conduits 120.

As many field soils exhibit characteristics of both sandy and clay soils, it may be beneficial to treat the soil with both a surfactant and a water holding agent. The particular combination can be tailored to the needs of the type of agricultural soil within the field 142 to be treated. For example, an operator of the irrigation system 100 may input a specified blend, or mixture, of surfactant and water holding agent according to one or more requirements of the field 142.

During operation, the control system 130 of the irrigation system 100 is configured to actively monitor and to maintain one of more soil characteristics within the root zone 218. For example, the sensors 144 are configured to at least instantaneously measure the moisture level of the soil in field 142. Additionally, the sensors 144 are configured to furnish a series of data points over a pre-defined time interval. In some implementations, the series of data points represent moisture characteristics of the soil following an irrigation event. The sensors 144 are configured to at least substantially continually measure the moisture characteristics of the soil and transmit the data points representing the measurements to the control system 130. The module 137 is configured to determine, or calculate, the time it takes for the moisture to move into, and then out of, the root zone 218 (i.e., the module 137 causes a calculation of a "soil recharge rate"). For example, the module 137 is configured to determine the soil recharge rate by calculating the time it takes for the moisture to move into the root zone 218 and then the time it takes for the moisture to move away (i.e., dissipate, move into other regions, etc.) after an application of a known amount of water over a known amount of time.

Thus, the module 137 is configured to determine baseline soil recharge rate for a field 142. In some instances, the baseline rate could be determined for a first irrigation event after an application of soil conditioning agents. In another instance, a threshold soil recharge rate could also be determined. The threshold rate may correspond to a soil recharge rate (e.g., represents a moisture value) of the field when soil conditioning agents should be reapplied (e.g., the root zone 218 is lacking a predefined threshold of moisture). When the calculated soil recharge rate for a given field is outside the threshold of the soil recharge rate, the module 137 is configured to cause the irrigation system 100 to automatically schedule a reapplication of the soil conditioning agents and/or water. For example, the module 137 may initiate operation of the irrigation system 100 to apply the soil conditioning agent to the field 142.

The module 137 could, in some implementations, achieve this reapplication process by instructing the control system 130 to automatically cause the control valve 150 of the repository 146 (i.e., a soil additive tank) to open, which allows the soil conditioning agents to mix with the irrigation water at the next scheduled irrigation event.

In some implementations, the sensors 144 may be used to measure soil electrical conductivity. Electrical conductivity, expressed in milliSiemens/meter (mS/m), may be used to indicate relative soil moisture holding capacity. For example, sand has an electrical conductivity of slightly above zero (0) mS/m to five (5) mS/m. Silt is typically between five (5) mS/m and fifty (50) mS/m, and clay is generally between ten (10) mS/m and one thousand (1000) mS/m. As a soil is able to hold more moisture as a percentage of its total weight, electrical conductivity generally increases. As a result, electrical conductivity may be used as a way of indirectly measuring the moisture holding capacity of a particular soil. If the electrical conductivity falls below a threshold value within a predefined time of an irrigation event, the irrigation system 100 may be used to apply soil conditioning agents to the soil.

In some embodiments, the module 137 is configured to cause the control system 130 to transmit one or more signals to an electronic device 146 of an operator (e.g., a grower). The one or more signals represent at least substantially real-time sensor 144 information that may be utilized to convey soil moisture content/values and trends relating to the moisture of the soil. Thus, the operator may use the information to predict and schedule when soil conditioning agents should be applied to the field 142.

Figure 3:
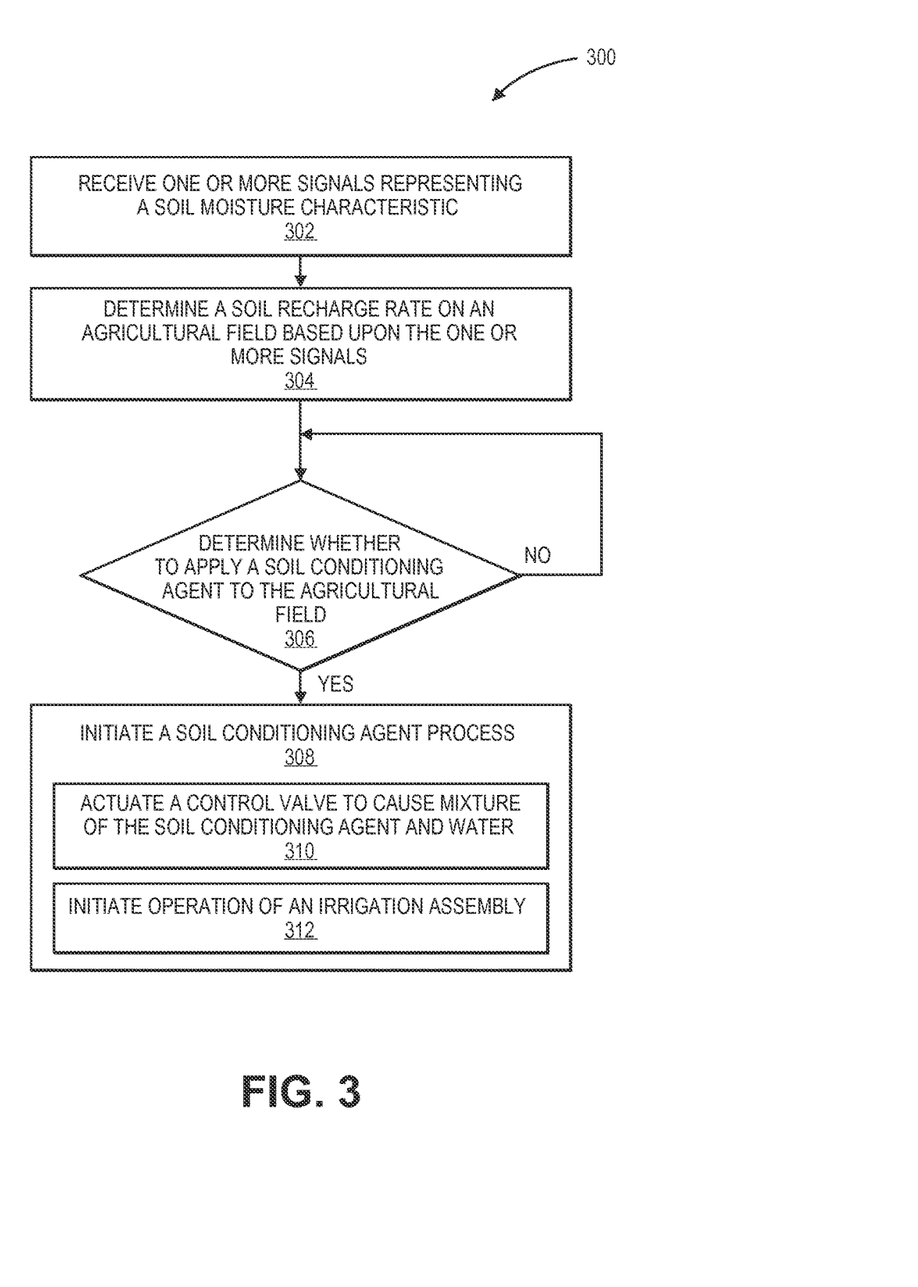
FIG. 3 is a flow diagram illustrating an example method for determining whether to disperse a soil conditioning agent in accordance with an example implementation of the present disclosure.

FIG. 3 illustrates an example method 300 for determining whether to apply, or disperse, a soil conditioning agent to a field, such as an agricultural field 142, in accordance with an example implementation of the present disclosure. As shown in FIG. 3, one or more signals representing a soil moisture content (e.g., characteristic) is received (Block 302). As described above, the sensors 144 (e.g., the plurality of sensors deployed within the field 142) are configured to transmit one or more signals to the irrigation system 100 that represent a soil moisture characteristic. A soil recharge rate of an agricultural field is determined based upon the one or more received signals (Block 304). The module 137 is configured to instruct the control system 130 determine a soil recharge rate based upon signals representing soil moisture characteristics transmitted from the sensors 144. In some implementations, the soil moisture characteristics represent a volumetric soil moisture measurement measured by the sensors 144. In other implementations, the sensors are configured to measure a soil electrical conductivity characteristic. Based upon the signals representing the measurements transmitted, the module 137 is configured to cause calculation of the soil recharge rate.

A determination is made on whether a soil conditioning agent should be applied to the agricultural field (Decision Block 306). As described above, a threshold Soil recharge rate may be calculated by the system 130, which indicates that the root zone 218 may require moisture. If application of the soil conditioning agent is not required (NO from Decision Block 306), the Soil recharge rate is monitored to determine when an application of the soil conditioning agent is required. For example, the module 137 is configured to cause the system 130 to at least substantially monitor the received signals from the sensors 144 to determine an application of the soil conditioning agent may be required. For example, the module 137 is configured to compare the soil moisture content with the soil recharge rate (e.g., the threshold soil recharge rate) to determine whether the soil moisture content is outside the soil recharge rate. If application of the soil conditioning agent is required (YES from Decision Block 306), a soil conditioning agent application process is initiated (Block 308). For example, a control valve is actuated to cause mixture of the soil conditioning agent and irrigation water within an irrigation assembly (e.g., irrigation system 100) (Block 310). The module 137 is configured to cause actuation of the control valve 150 of the repository 146 to allow the soil conditioning agent to mix with the irrigation water within the conduits 120, 121, 122. As shown in FIG. 3, operation of an irrigation assembly is initiated (Block 312). The module 137 is also configured to cause the control system 130 to initiate operation of the irrigation assembly (e.g., irrigation system 100). Thus, once the soil conditioning agent has mixed with the irrigation water, operation of the irrigation assembly is initiated to disperse the mixture over the field 142.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:
1. A control system for controlling operation of an irrigation assembly, the control system comprising:
    a memory operable to store one or more modules;
    a processor coupled to the memory, the processor operable to execute the one or more modules to cause the processor to:
        receive one or more signals from a soil sensor for determining the threshold soil recharge rate for the soil, wherein the threshold recharge rate represents the time it takes for applied moisture to move into, and then out of, a root zone for a selected crop;

determine whether to apply a soil conditioning agent to the soil based upon the determined threshold soil recharge rate for the selected crop;

initiate operation of the irrigation assembly to apply the soil conditioning agent to the soil; and determine and schedule when the soil requires reapplication of the soil conditioning agent based at least in part on the threshold soil recharge rate.

2. The control system as recited in claim 1, wherein the initiate operation of the irrigation assembly to apply the soil conditioning agent to the soil in response when the soil required the soil conditioning agent further comprises cause actuation of a control valve to allow the soil conditioning agent to mix with water disposed within the irrigation assembly.

3. The control system as recited in claim 2, wherein the soil conditioning agent is stored within a repository configured to store the soil conditioning agent, the repository in fluid communication with the irrigation assembly.

4. The control system as recited in claim 3, wherein the repository comprises as storage tank.

5. The control system as recited in claim 1, wherein the one or more signals represent an electrical conductivity of the soil.

6. The control system as recited in claim 1, wherein the one or more signals represent a volumetric soil moisture content of the soil.

7. A method of operating an irrigation assembly, the method comprising:

receiving one or more signals representing a soil moisture characteristic within an agricultural field from at least one soil sensor positioned within the agricultural field;

determining a soil recharge rate of the agricultural field based upon the one or more signals, the soil recharge rate representing a moisture value of the soil corresponding to when the soil requires a reapplication of a soil conditioning agent;

determining whether to apply the soil conditioning agent to the agricultural field based upon the soil moisture characteristic compared with respect to the soil recharge rate; and initiating operation of the irrigation assembly to disperse the soil conditioning agent over the agricultural field when a determination has been made to apply the soil conditioning agent.

8. The method as recited in claim 7, further comprising actuating a control valve to cause the soil conditioning agent to mix with water disposed within the irrigation assembly.

9. The method as recited in claim 8, wherein the soil conditioning agent is stored within a repository in fluid communication with the irrigation assembly, the control valve operatively coupled to the repository.

10. The method as recited in claim 9, wherein the repository is a storage tank configured to store the soil conditioning agent.

11. The method as recited in claim 7, wherein the one or more signals represent an electrical conductivity of the soil.

12. The method as recited in claim 7, wherein the one or more signals represent a volumetric soil moisture characteristic of the soil.

* * * * *